United States Patent
Grenot et al.

[11] 3,769,512
[45] Oct. 30, 1973

[54] OPTIC RELAY COMPRISING A PHOTOCONDUCTOR ELEMENT

[75] Inventors: Michel Grenot, Brunoy; Jean Pergrale, Paris, both of France

[73] Assignee: U.S. Phillips Corporation, New York, N.Y.

[22] Filed: Oct. 13, 1972

[21] Appl. No.: 297,189

[30] Foreign Application Priority Data
Oct. 15, 1971 France .................. 7137109

[52] U.S. Cl. .......... 250/225, 250/211 J, 250/212, 350/150
[51] Int. Cl. ........................... G02f 1/18
[58] Field of Search ............. 350/150; 250/213 R, 250/225, 211 J, 212

[56] References Cited
UNITED STATES PATENTS

| | | | |
|---|---|---|---|
| 3,713,723 | 1/1973 | Buchan | 350/150 |
| 3,449,583 | 6/1969 | Eden | 350/150 |
| 3,631,253 | 12/1971 | Aldrich | 250/225 |
| 3,499,157 | 3/1970 | Satake et al. | 250/225 |
| 3,601,468 | 8/1971 | Dailey | 350/150 |

*Primary Examiner*—Harold A. Dixon
*Attorney*—Frank R. Trifari

[57] ABSTRACT

The invention relates to an optic relay comprising a plate of an electro-optic material having a double refraction which is variable in accordance with the voltage applied between its faces. Said voltage is applied via a photoconductor layer whose photoconductivity is modulated by the image to be transmitted. The invention includes the constitution and certain method of manufacturing said relay.

8 Claims, 1 Drawing Figure

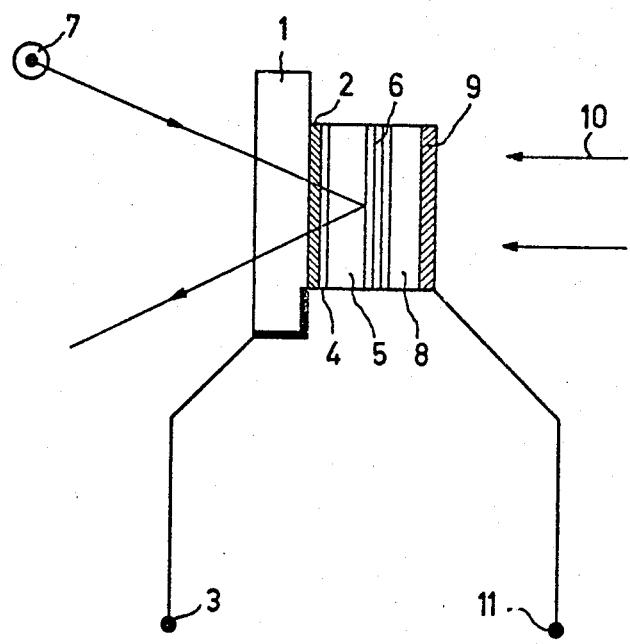

OPTIC RELAY COMPRISING A PHOTOCONDUCTOR ELEMENT

The present invention relates to an optic relay in which, on the picture display side, the plate of electro-optic material is provided with various superimposed layers in the succession: a multi-layer dielectric mirror, a photoconductor layer and a transparent conductor layer. In particular, the invention relates to a method of manufacturing said relay having a structure comprising a photoconductor layer and extends to the methods of preparing certain of the layers serving to constitute the relay, notably the photoconductor layer.

The technical problems which present themselves during the manufacture of said layers relate to the fact that each of the layers must present simultaneously mechanical, chemical and physical properties, notably particular electric and optical properties, certain of them being related to the part proper played by the said layers in the relay, the other ones to the presence of the adjacent elements.

As far as the photoconductor layer is concerned it must present a very high electric resistance, notably parallel to the dielectric mirror and the plate of electro-optical material in such manner that the transfers of charges in the photoconductor layer do not occur in directions other than that of the electric field applied to the plate-photoconductor layer assembly.

The coefficient of thermal expansion of said photoconductor layer must be sufficiently close to that of the plate of electro-optical material. In the opposite case, actually, mechanical stresses will occur in the various layers constituting the target of the relay which would produce either the working loose of the said layers or their fracture.

The gain of photoconductivity of the layer must still be sufficient to produce, under the action of photons, the variation of the potential necessary for the variation of double refraction of the electro-optical material. Moreover it is important that the photosensitivity be selective, that is to say that the gain in photoconductivity varies sufficiently as a function of the wavelength of the exciting light. Actually, in the absence of selectivity, upon reading the picture which is effected by means of a light beam, the greater part of the reading light is reflected by the dielectric mirror but a part of it nevertheless traverses the mirror, so that the charge image could be disturbed; if, on the contrary, the photoconductor is selective, a light beam may be chosen for reading the picture so that the spectrum of the light beam differs from that of the beam used for the formation of the charge image, such that the former does not disturb the said picture upon reading.

The transparent conductor layer for its part must present the following properties:
- good electric conductivity,
- good transparency in the visible region.

It must moreover constitute a blocking contact with the photoconductor layer and must have an excellent mechanical behaviour with very small thickness (100 to 200 A.) so as to permit an electric contact connection.

All these properties of the various layers must be present in the final relay, which implies the existence of particular conditions and methods for depositing the layers which conditions and methods do not vary, the properties of the materials that are previously selected as satisfactory. Such conditions and methods deposition must notably permit of avoiding the diffusion of elements belonging to one of the layers into another.

It is the object of the present invention to provide the structure of the relay, and notably the photoconductor layer and the transparent conductor layer thereof, in such manner that the above-mentioned properties for the said layers are attained. A choice of materials is made and methods are performed for the deposit, assembly and structure of the layers.

According to the present invention, the optic relay includes an evacuated envelope comprising at least one window which is transparent to a light radiation, a plate electro-optic material held at a temperature near its Curie temperature and presenting a double refraction which is variable as a function of the difference in the voltage applied between its faces, the plate face opposite to the transparent window being provided with a transparent conductive layer, while the other face is covered with a succession of superimposed layers, namely a multi-layer dielectric mirror manufactured with materials such as LiF, $CaF_2$, ZnS, MgO, $Ta_2O_5$, $Al_2O_3$ or $TiO_2$, for example a layer of a photoconductor material and an electrically conductive layer which is transparent to a light radiation. The photoconductor material is selenium (Se), or a compound of arsenic and selenium, or even a compound of arsenic and tellurium, in an amorphous form or very slightly crystallized and the conductor layer covering the photoconductor material is a layer of a noble metal such as silver, gold, platinium, for example, or semiconductor material such as $In_2O_3$ or $SnO_2$ for example.

The invention will be better understood from the description of the following embodiment given by way of example, to which is attached the drawing of a single FIGURE which represents a sectional view of the optical relay device.

The relay comprises a strip 1 of a material transparent to the reading light, which strip serves to support the assembly of the relay, a conductive layer 2 transparent to the reading light and connected to a contact 3, an aluminium layer 4 forming the connection between the conductive layer 2 and the plate 5 of electro-optical material, for example, of deuterated diacid potassium phosphate (KDP), a multi-layer dielectric mirror 6 permitting the reflection of the reading light issued from the source 7;

A photoconductor layer 8 and a conductor layer 9 transparent to the display light 10, the conductor layer 9 being connected to an electrical contact 11.

For the manufacture, e.g., on the photoconductor layer, the fact that same must present a high resistivity, e.g., on the order of $10^{12}$ to $10^{13} \Omega$ cm has resulted in the use of amorphous bodies or slightly crystallized bodies. The photoconductor layer must be deposited on the last layer of the dielectric mirror, for example, of ZnS, MgO, $Ta_2O_5$, $Al_2O_3$ or $TiO_2$. Deposits on such substrates are not found in the literature. During experiments, the material chosen, according to the present invention, for the photoconductor has been selenium, the compounds of arsenic and selenium and the compounds of arsenic and tellurium, these presenting a high resistivity and an important gain of conductivity associated with a good selectivity of the exciting radiations of the said photo-conductivity.

The invention further includes a method of depositing under the proper conditions. The deposit must affect neither the actual and useful properties of the deposited body, nor the useful properties of the other components of the relay. During the deposit, there should be avoided a reaction in the solid phase between the dielectric mirror and the photoconductor; such a reaction is made possible by the fact that the lime-forming materials used as photoconductor layers have melting temperatures which are not very high, which results in a significant diffusion coefficient of the ions which constitute them at only a few tens of degrees above the ordinary temperature. By way of example, the diffusion of sulphur (S) contained in the dielectric mirror layer of ZnS which layer is next to a photoconductor, of selenium occurs when the temperature of the substrate (constituted by the double refracting electro-optic plate 5 and the dielectric mirror 6) is slightly elevated. When such diffusion occurs, it endangers the quality of the dielectric mirror and affects the nature of the contact between the photoconductor and the dielectric mirror, the gain of photoconductivity and the spectral sensitivity of the photoconductor.

According to the invention, the deposition of the photoconductor material is carried out in temperature ranges of the KDP electro-optic plate and the dielectric mirrors arranged to avoid the undesirable diffusion. Said temperature ranges lie between −50° C and a upper limit equal to +80° C for selenium, and between −50° C and an upper limit equal to +145° C for the compounds of arsenic and selenium and the compounds of arsenic and tellurium. The deposit is effected by evaporation from a crucible. In order to avoid excessively heating the substrate by the radiation of the crucible, the evaporation time is limited to 15 to 20 minutes, for example. A particular method to limit said evaporation time and consequently the temperature of the substrate and the instant of deposit resides according to the invention in the use of "flash" evaporation.

According to the present invention, the photoconductor layer is covered by a transparent conductor layer of a very small thickness. Said layer is constituted either by a noble metal such as Ag, Au, Pt, or semiconductors such as $In_2O_3$, $SnO_2$. Said choice results from experiments and from the fact that said layers have proved to possess the already described desirable properties. The invention extends to the method of depositing said layers effected in particular conditions. The method usd is that of cathode sputtering. Said cathode sputtering takes place in an atmosphere substantially completed free from water vapour traces. The power used is at a held low level such that the energy of the particles thrown during the sputtering remains low and, consequently, the photoconductor layer is not heated and does not recrystallize or even that it does not deteriorate during the cathodic bombardment. Moreover, the power is adjusted in such manner that the deposition time be sufficiently long to be controllable and permits a reproducibility of the layers: approximately 20 seconds, for example, for a thickness of 200 A.

What is claimed is:

1. An optic relay comprising:
   a. an evacuated envelope comprising at least one window transparent to radiation of a first wavelength;
   b. an electrically conducting first layer having one face thereof adjacent said transparent window and another face removed therefrom, said first layer being transparent to said first wavelength radiation;
   c. a plate comprising material exhibiting electro-optic properties and a Curie point, said plate having a first face proximate said other face of said conducting first layer and a second face removed therefrom, said plate being operable at a temperature near said Curie point and being chracterized by a double refraction varying with the voltage difference applied between the faces of said plate;
   d. a multi-layer dielectric mirror disposed at said other face of said plate, said mirror comprising material selected from the group consisting essentially of $L_iF$, $C_aF_2$, ZnS, $M_oO$, $Ta_2O_5$, $Al_2O_3$, and $TiO_2$;
   e. a photoconducting layer disposed adjacent to said mirror and being responsive to second wavelength radiation, said photoconductive layer comprising a material selected from the group consisting essentially of selenium, an arsenic-selenium compound, and an arsenic-tellurium compound, said layer consisting of material that is one of substantially completely amorphous and only slightly crystalline;
   f. an electrically conducting second layer disposed adjacent to said photoconducting layer and being transparent to said second wavelength radiation, said second layer being of a material selected from the group consisting essentially of a noble metal and a semiconductor material; and
   g. means for applying an electrical potential between said first and second layers.

2. An optic relay as recited in claim 1, wherein said noble metal is selected from the group consisting of silver, gold, and platinum and said semiconductor material is selected from the group consisting of $In_2O_3$ and $SnO_2$.

3. An optic relay as recited in claim 1, wherein said photoconducting layer is provided by evaporating said photoconductor material on a sub-assembly comprising said electro-optic layer and said multi-layer mirror, said evaporation being carried out such that said sub-assembly temperature does not exceed about 80° C and about 145° C when said photoconductor material is, respectively, selenium and a compound consisting essentially of one of selenium-arsenic and arsenic-tellurium.

4. An optic relay as recited in claim 1, wherein said photoconducting layer has a resistivity in the range of about $10^{12}$ to about $10^{13}$ ohm-cm.

5. An optic relay as recited in claim 1, wherein said conducting second layer is a cathode sputtered layer, said layer being sputtered on said photoconductor layer such that the temperature of said photoconductor layer does not exceed about 80° C and about 145° C when said photoconductor materil is, respectively, selenium and a compound consisting essentially of one of selenium-arsenic and arsenic-tellurium.

6. An optic relay as recited in claim 1, wherein said conducting second layer is a flash evaporated layer.

7. An optic relay as recited in claim 1, wherein said electro-optic material is deuterated diacid potassium phosphate.

8. A method of producing the optic relay comprising the steps of:
   a. providing a sub-assembly comprising
      i. a substrate transparent to first wavelength radiation,
      ii. an electrically conducting first layer disposed at said substrate and transparent to said first wavelength radiation, iii. a plate consisting of electro-optic material and disposed at said first layer, said first layer being disposed between said substrate and said electro-optic plate, said electro-optic material exhibiting a Curie temperature and being characterized by a double refraction varying with the potential difference thereacross; and iv. a multi-layer dielectric mirror disposed at said electro-optic plate and removed from said first layer, said mirror comprising material selected from the group consisting essentially of LiF, $CaF_2$, ZnS, MgO, $Ta_2O_5$, $Al_2O_3$, and $TiO_2$;

b. evaporating a photoconducting material on said mirror to form a photoconducting layer, said material being responsive to second wavelength radiation and being selected from the group consisting essentially of selenium, an arsenic-selenium compound, and an arsenic-tellurium compound, said layer being one of substantially completely amorphous and only slightly crystalline, said evaporation being carried out such that said sub-assembly temperature does not exceed about 80° C and about 145° C when said photoconductor material is, respectively, selenium and a compound consisting essentially of one of selenium-arsenic and arsenic-tellurium;

c. providing an electrically conducting second layer on said photoconductor layer, said second layer being transparent to said second wavelength radiation and being of a material selected from the group consisting essentially of a noble metal and a semiconductor material, said second layer being provided by one of evaporation and cathode sputtering under such conditions that said sub-assembly temperature does not exceed about 80° C and about 145° C when said photoconductor material is, respectively, selenium and a compound consisting essentially of one of selenium-arsenic and arsenic-tellurium; and then d. providing electrical connection means to said conducting first and second layers.

\* \* \* \* \*

PO-1050
(5/69)

UNITED STATES PATENT OFFICE
CERTIFICATE OF CORRECTION

Patent No. 3,769,512          Dated October 13, 1973

Inventor(s) MICHEL GRENOT ET AL

It is certified that error appears in the above-identified patent and that said Letters Patent are hereby corrected as shown below:

In the Title Page Section [73] change "Phillips" to

--Philips--.

Signed and sealed this 16th day of April 1974.

(SEAL)
Attest:

EDWARD M.FLETCHER,JR.        C. MARSHALL DANN
Attesting Officer             Commissioner of Patents